United States Patent [19]

Grawi et al.

[11] Patent Number: 4,713,097

[45] Date of Patent: Dec. 15, 1987

[54] INTEGRATED ENGINE AIR CLEANER AND VENTURI RESONATOR

[75] Inventors: Franklin L. Grawi, Southfield; Michael B. Magnan, Dearborn, both of Mich.

[73] Assignee: Ford Motor Company, Dearborn, Mich.

[21] Appl. No.: 19,990

[22] Filed: Feb. 27, 1987

[51] Int. Cl.[4] .............................................. B01D 46/00

[52] U.S. Cl. ........................................ 55/276; 55/497; 181/229; 123/198 E

[58] Field of Search ......................... 55/276, 510, 497; 181/229; 123/198 E

[56] References Cited

FOREIGN PATENT DOCUMENTS 3429633 2/1986 Fed. Rep. of Germany ........ 55/276

*Primary Examiner*—Bernard Nozick

*Attorney, Agent, or Firm*—Robert E. McCollum; Clifford L. Sadler

[57] ABSTRACT

An integral air cleaner-noise silencer assembly includes a filter element dividing the assembly into lower and upper parts, the upper part constituting a lid or cover for the filter and including a funnel-like clean air outlet containing a venturi with as small a throat as practical to provide a maximum restriction of noise with a minimum restriction to air flow, the air outlet and venturi being overlaid by a resonator chamber having an annular inlet surrounding and concentric with the venturi diffuser outlet for dampening the acoustical energy of engine sound waves, the venturi diffuser walls also reflecting the waves back toward the engine.

4 Claims, 4 Drawing Figures

INTEGRATED ENGINE AIR CLEANER AND VENTURI RESONATOR

This invention relates in general to a combination engine air cleaner and noise silencer to provide both a source of clean air to the engine and to dampen or suppress engine induction noise feedback.

Combination engine air cleaner-noise silencers are known. For example, U.S. Pat. No. 2,783,855, Karn et al, shows in FIG. 1 such a combination consisting of an air inlet for flow through a filter element into the inlet of a tubular member of constant diameter for passage therefrom into the engine proper, holes in the tubular element communicating the air with a dead air space 66 constituting a resonating chamber. The tube 49 is straight in this case and, therefore, causes a non-recovered pressure loss. It also transmits noise back to the inlet. The invention to be described includes a venturi having a small throat and an efficient diffuser to provide excellent flow characteristics and pressure recovery, and, therefore, efficient operation, and further traps noise emanating from the engine as well as reflects the same off the tapering walls of the diffuser back into the engine inlet.

The use of venturis in connection with engine inlets for silencing noises also is known. For example, U.S. Pat. No. 1,578,682, Raymond, shows in FIG. 2 such a venturi, as does Moyer in U.S. Pat. No. 2,943,683, in FIG. 2, Schonberger et al, U.S. Pat. No. 3,998,614, in FIG. 8, and Hoffman, U.S. Pat. No. 2,869,670. These references, however, show merely an isolated use of a venturi per se, and do not show a combination air cleaner-silencer of the construction of the invention.

The prior art does not show, and it is a primary object of the invention to provide, an integral air cleaner assembly that includes a venturi with as small a throat as practical and an efficient diffuser outlet to provide a maximum restriction to noise with a minimum restriction to air flow, and a dead air space type resonator chamber, the latter having an annular inlet concentric with the outlet of the venturi for breaking up the engine sound waves, the venturi reflecting engine acoustical waves off the tapering, slanted walls of its diffuser back toward the engine.

Other objects, features and advantages of the invention will become more apparent upon reference to the succeeding, detailed description thereof, and to the drawings illustrating the preferred embodiment thereof; wherein.

Figure 1:
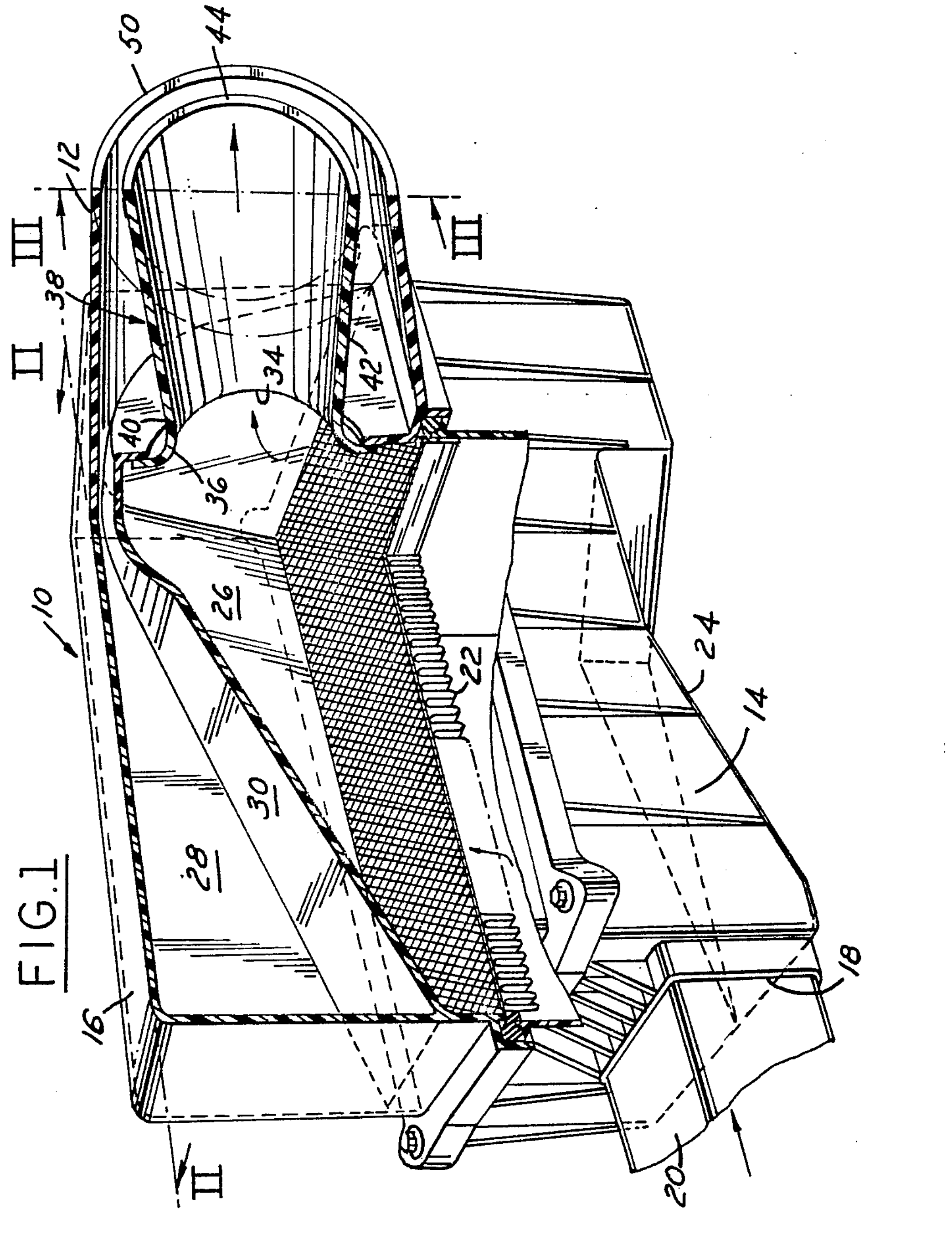
FIG. 1 is a perspective view of an air cleaner-silencer assembly embodying the invention.
Figure 2:
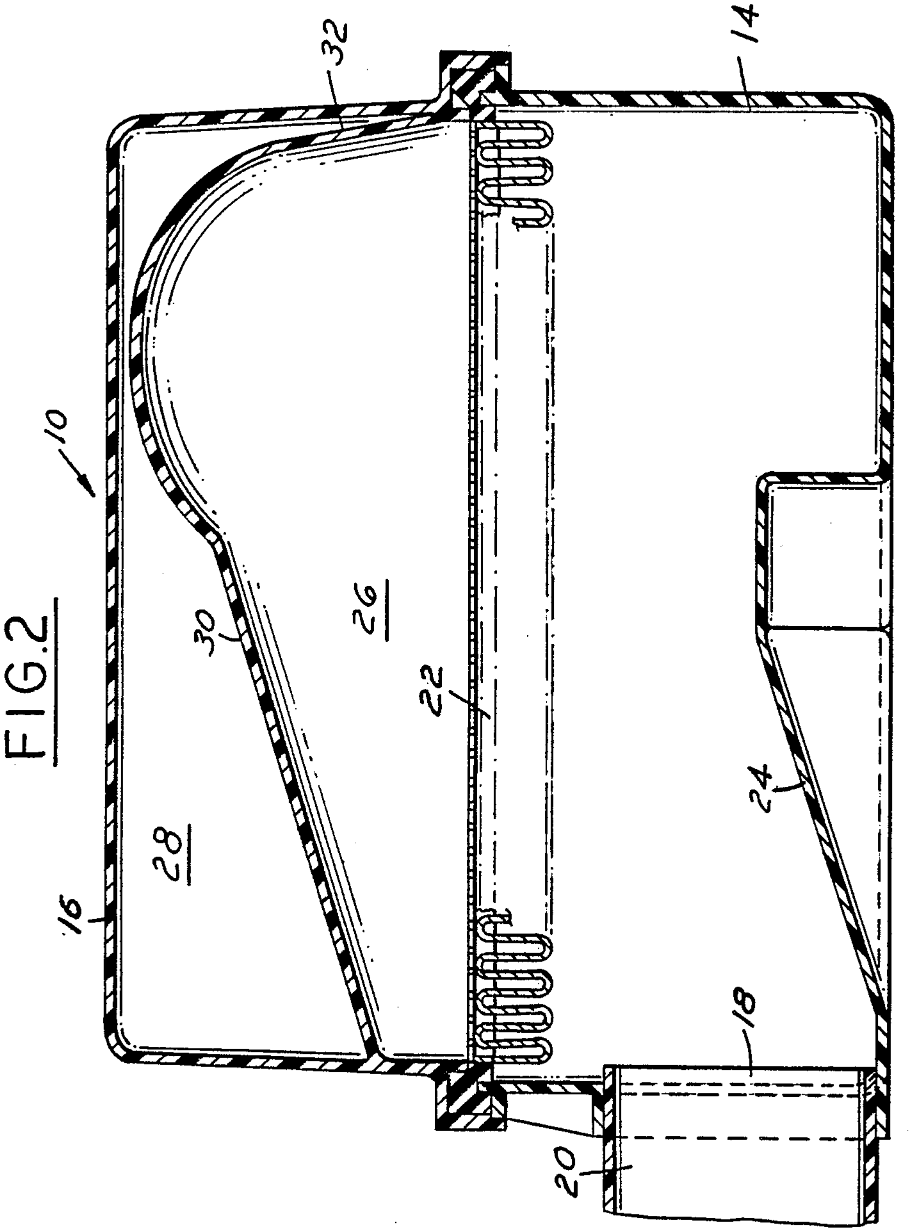
FIGS. 2 and 3 are cross-sectional views taken on planes indicated by and viewed in the direction of the arrows II—II and III—III, respectively, of FIG. 1.

FIG. 1 shows an assembly that includes a hollow shell-type housing 10 having essentially a rectangular shape with a snout-like portion 12 projecting from one side. The housing is essentially in two parts, a lower filter containing part or portion 14, and an upper cover portion 16. The lower portion 14 has a rectangular air inlet 18 connected by a tube 20 to a source of fresh/ambient air. The air entering tube 20 may be directed thereto from an inlet duct in the front portion of the engine vehicle compartment of an automotive type vehicle, for example.

The two parts 14 and 16 are separated by a flat pleated paper-type air filter 22 mounted in the top of lower portion 14. A guide ramp type wall 24 is formed in lower portion 14 to direct the flow of air in inlet 18 upwardly through the filter 22. The upper portion 16 of the housing constitutes a lid for covering the filter and also for directing the air outwardly towards the inlet of the engine induction system.

Figures 3, 4:
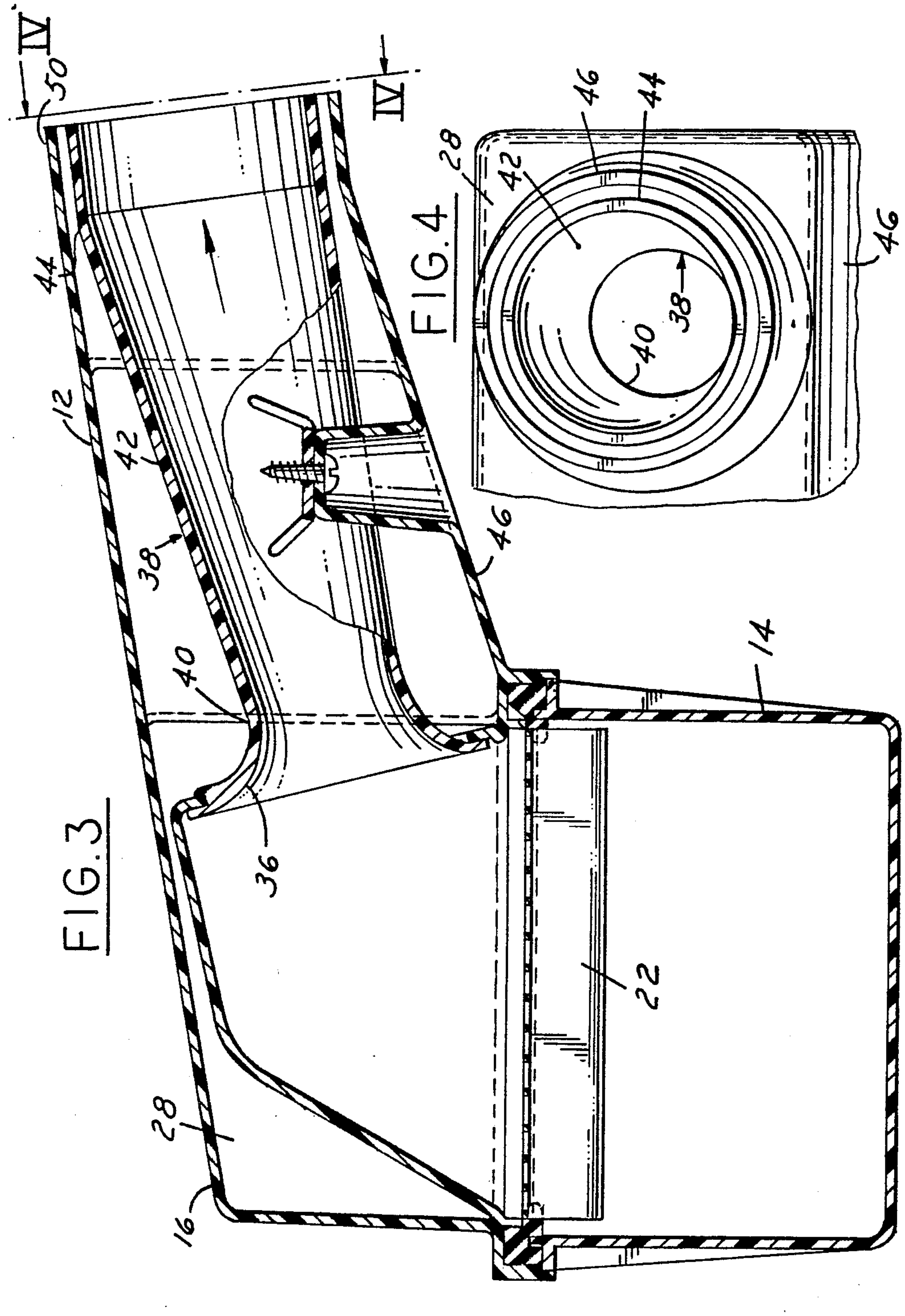
FIG. 4 is an end elevational view taken on a plane indicated by and viewed in the direction of the arrows IV—IV of FIG. 3.

More specifically, lid 16 is divided into an air flow chamber 26 and a resonant chamber 28 by a partition wall 30. The air flow chamber has a funnel-like shape with wall 30 paralleling the guide wall 24 in lower portion 14. Wall 30 is curved at its end portion 32 to provide a dome or hoodlike shape to chamber 26, and is formed at right angles with an annular outlet 34 in one wall of the chamber, as best seen in FIGS. 1 and 3. Positioned within outlet 34 is the smoothly rounded inlet 36 of a convergent-divergent venturi 38. The latter has the usual throat section 40 of narrowest crosssection that increases the velocity of the air flow, and an elongated diffuser 42 of gradually increasing area. The throat size would be chosen or desiqned to be as small as practical to provide the maximum restriction to noise with a minimum restriction to the air flow. The diffuser is defined by walls that taper gradually outwardly from the throat section towards an outlet 44 to provide efficient pressure recovery in a known manner. The venturi in this case is supported as shown in FIG. 3 upon the wall 46 defining the lower portion of chamber 28.

Chamber 28 in this case constitutes a closed dead air type resonator chamber superimposed over and covering the funnel or hood-like air flow chamber 26, as clearly shown in FIG. 1. The chamber also is formed with a right angled portion that surrounds venturi 38 and is formed with an annular inlet 50 that is concentric with and radially spaced from the venturi diffuser outlet 44, as also seen in FIG. 1.

With the above construction, it will be clear that during engine operation, air will be sucked into the engine through the inlet tube 20 up through filter 22, into the funnel-like chamber 26, and into the inlet 36 of venturi 38. The flow through the venturi provides the most efficient flow because it enables the flow volume to be accelerated with a minimum pressure loss and very high efficiency of operation, minimizing separation and other flow losses. The air flow velocity is increased by passage through the throat section 40 of the venturi where there is a pressure drop proportional to the square of the air flow velocity increase. The air flow then gradually expands through the conical section of the streamlined venturi diffuser 42 where the pressure is efficiently recovered.

At the same time, noise via sound waves, indicated at 52, that are generated by the engine pass from the engine back towards the air cleaner assembly and enter both the outlet of the venturi diffuser 44 as well as the annulus 50 that opens into the closed chamber 28. The latter absorbs or breaks up and dissipates the acoustical energy of the waves while the slanting, angled or tapering walls of the diffuser 42 reflect the waves in all directions back towards the engine. The elongated diffuser provides a large throat to diffuser outlet area ratio, which is effective for good noise reduction. The inlet throat area 40 of the venturi further restricts passage of the acoustical waves towards the inlet to the air cleaner assembly.

From the above, it will be clear that the invention provides a combination air cleaner-silencer that provides a flow of clean air through a venturi into the engine proper in an efficient manner with a minimum pressure loss while at the same time reducing and dampening engine noises by either breaking up the acoustical waves or dissipating them by absorption in a dead air compartment surrounding the venturi or reflecting the same back into the engine off the walls of the diffuser of the venturi.

While the invention has been shown and described in its preferred embodiment, it will be clear to those skilled in the arts to which it pertains that many changes and modifications may be made thereto without departing from the scope of the invention.

We claim:

1. An air cleaner-engine induction noise silencer combination for a motor vehicle type internal combustion engine, comprising an air cleaner housing having first and second parts defined by an air filter element located between, an ambient air inlet into the first part, a clean air outlet in the second part, means including a venturi connecting the outlet to the filter, and a noise reducing resonator cooperating with the outlet to suppress engine induction noise feedback, the resonator including a closed chamber having an inlet thereto concentric with the air outlet and radially spaced therefrom for the dissipation of sound waves therebetween into the chamber, the venturi having a gradually tapering diffuser gradually increasing in area from the throat of the venturi towards the outlet to provide efficient operation through maximum air flow pressure recovery while concurrently further reducing the acoustic energy of the engine induction noise by reflecting the same off the tapering walls of the venturi back towards the engine.

2. An air cleaner-engine induction noise silencer combination for a motor vehicle type internal combustion engine, comprising an air cleaner housing having a lower air filter element containing part and an upper cover lid, an ambient air inlet into the lower part, a clean air outlet from the upper part, a hood member within the lid overlying and covering the lower part and filter element, the member including a converging-diverging venturi including a throat and a diffuser for increasing the flow velocity and providing efficient pressure recovery, means connecting the outlet of the diffuser to the clean air outlet, and a noise reducing resonator chamber superimposed over the hood member within the lid, the chamber being closed except for an annular inlet thereto adjacent and concentric with the outlet and radially spaced therefrom and cooperating with the outlet to suppress engine induction noise feedback, the resonator dissipating sound waves moving from the engine back towards and into the chamber and outlet, the venturi having a gradually tapering diffuser gradually increasing in area from the throat towards the outlet to provide maximum air flow pressure recovery while concurrently further reducing the acoustic energy of the engine induction noise by reflecting the same off the tapering walls of the venturi back towards the engine.

3. A combination as in claim 1, wherein the venturi has a small throat area and a large throat to diffuser outlet area ratio for effective noise reduction.

4. An air cleaner-engine induction noise silencer combination for a motor vehicle type internal combustion engine, comprising an air cleaner housing having first and second parts, the first part containing an air filter element having a clean air discharge side, an ambient air inlet into the first part, a clean air outlet from the second part, the second part having a converging-diverging venturi having an inlet connected to the discharge side of the filter and including a throat and a diffuser for increasing the flow velocity and providing efficient pressure recovery, means connecting the outlet of the diffuser to the clean air outlet, and a noise reducing resonator chamber superimposed over the venturi, the chamber being closed except for an annular inlet thereto adjacent to and concentric with the outlet and radially spaced therefrom and cooperating with the outlet to suppress engine induction noise feedback, the resonator dissipating sound waves moving from the engine back towards and into the chamber and outlet, the venturi having a gradually tapering diffuser gradually increasing in area from the throat towards the outlet to provide maximum air flow pressure recovery while concurrently further reducing the acoustic energy of the engine induction noise by reflecting the same off the tapering walls of the venturi back towards the engine.

* * * * *